US006422612B1

United States Patent
Hays et al.

(10) Patent No.: US 6,422,612 B1
(45) Date of Patent: Jul. 23, 2002

(54) LATCH MECHANISM FOR PAD-MOUNTED TRANSFORMER CABINET

(75) Inventors: Stanley M. Hays, Shreveport, LA (US); Jasdeep Bhusri, Plainville, CT (US); Lonnie Butler, Narre Waurren (AU)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 09/475,508

(22) Filed: Dec. 30, 1999

(51) Int. Cl.[7] ................................................ E05C 5/00
(52) U.S. Cl. .................................. 292/5; 292/56; 292/7
(58) Field of Search .............................. 292/5, 63, 66, 292/68, DIG. 68; 312/216; 174/46, 50, 17 R

(56) References Cited

U.S. PATENT DOCUMENTS

| | | | | |
|---|---|---|---|---|
| 1,060,251 A | * | 4/1913 | Hagstrom | |
| 1,438,233 A | * | 12/1922 | Hammann | |
| 2,137,654 A | * | 11/1938 | Reis | |
| 2,169,692 A | * | 8/1939 | Hansen | |
| 2,272,145 A | * | 3/1942 | Anderson et al. | |
| 2,757,031 A | * | 7/1956 | Levin | |
| 3,953,061 A | * | 4/1976 | Hansen et al. | 292/5 |
| 4,165,894 A | * | 8/1979 | Wojciechowski | 292/7 |
| 4,641,865 A | * | 2/1987 | Pastva | |
| 4,963,696 A | | 10/1990 | Owen et al. | |
| 5,078,437 A | | 1/1992 | Borgmeyer et al. | |
| 5,150,934 A | * | 9/1992 | Grody | 292/288 |
| 5,183,310 A | * | 2/1993 | Shaughnessy | 296/56 |

FOREIGN PATENT DOCUMENTS

| | | |
|---|---|---|
| DE | 2609848 A1 | 10/1976 |
| DE | 4122740 A1 | 1/1993 |
| DE | 29618567 U1 | 1/1997 |
| DE | 19617575 A1 | 5/1997 |
| DE | 19616455 A1 | 10/1997 |
| JP | 187264 | * 2/1999 |

* cited by examiner

Primary Examiner—James R. Brittain
Assistant Examiner—Mark Williams
(74) Attorney, Agent, or Firm—Cantor Colburn LLP

(57) ABSTRACT

A transformer cabinet door latch in the form of a shaped plate includes rod apertures at opposing ends for connecting with the latch rods and a door handle aperture intermediate the rod apertures for fastening to the cabinet operating door handle. A door stop in the form of a U-shaped rod is positioned on the bottom of the cabinet door frame to hold the cabinet door in the open position until and unless one end is released from the door bottom.

14 Claims, 2 Drawing Sheets

LATCH MECHANISM FOR PAD-MOUNTED TRANSFORMER CABINET

BACKGROUND OF THE INVENTION

Three phase pad-mounted transformers such as described within U.S. Pat. No. 4,326,181 entitled "High Voltage Winding for Dry Type Transformers" usually include a transformer cabinet that houses the high voltage connectors. Latch mechanisms, such as described within U.S. Pat. No. 5,078,437 entitled "Transformer Having an Integral Cabinet with Door Latching and Locking Apparatus", are employed to comply with safety code requirements.

The provision of such latch mechanisms results in added cost to the transformer in view of the number of components that are attached to the cabinet door and door frame.

To comply with an additional safety code requirement, door stops are usually attached to the bottom of the door frame to prevent the door from becoming closed while the interior components are being serviced. The provision of door stops in the form of welded lugs and the like further increases the transformer costs due to the deformation of the door frame during the welding and subsequent annealing processes.

It would be economically advantageous to provide a simplified latch having fewer parts for assembly as well as door stop that does not require welding and annealing.

BRIEF SUMMARY OF THE INVENTION

A transformer cabinet door latch in the form of a shaped plate includes rod apertures at opposing ends for connecting with the latch rods and a door handle aperture intermediate the rod apertures for fastening to the cabinet operating door handle. Rotation of the door handle in the clock-wise direction drives the latch rods out from the door frame and allows access to the cabinet interior. A door stop in the form of a U-shaped rod is positioned on the bottom of the cabinet door frame. One end of the rod is rotationally attached to the door frame while the other end is attached to the bottom of the door whereby the door is rotated 90 degrees to the open position and held in the open position until and unless the other end is released from the door bottom.

DETAILED DESCRIPTION OF THE INVENTION

Figure 1:
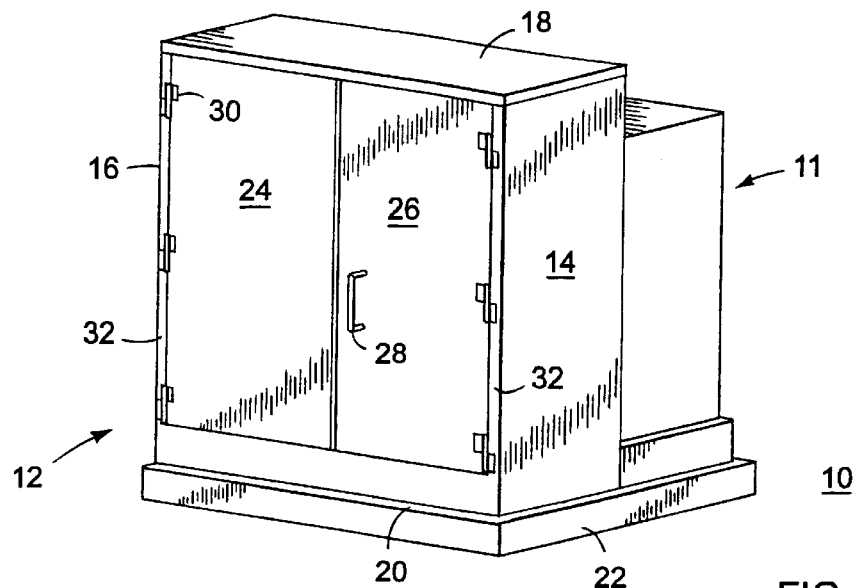
FIG. 1 is a front perspective view of a pad-mounted transformer containing the latch mechanism of the present invention.

The pad-mounted transformer 10 shown in FIG. 1 is similar to that described in the aforementioned U.S. Pat. No. 4,326,181 having an air-filled medium voltage transformer 11 to which access is made via an access cabinet 12 that contains the high voltage cables (not shown). The cabinet 12 has opposite sides 14, 16, opposite top and bottom plates 18, 20, and a frame 32 all arranged on a cement support pad 22. Access to the interior of the cabinet is made by means of left and right doors 24, 26 by means of the external handle 28 and hinges 30. Although not shown, the handle 28 may include a locking hasp and pad lock in accordance with electric code requirements.

Figure 2:
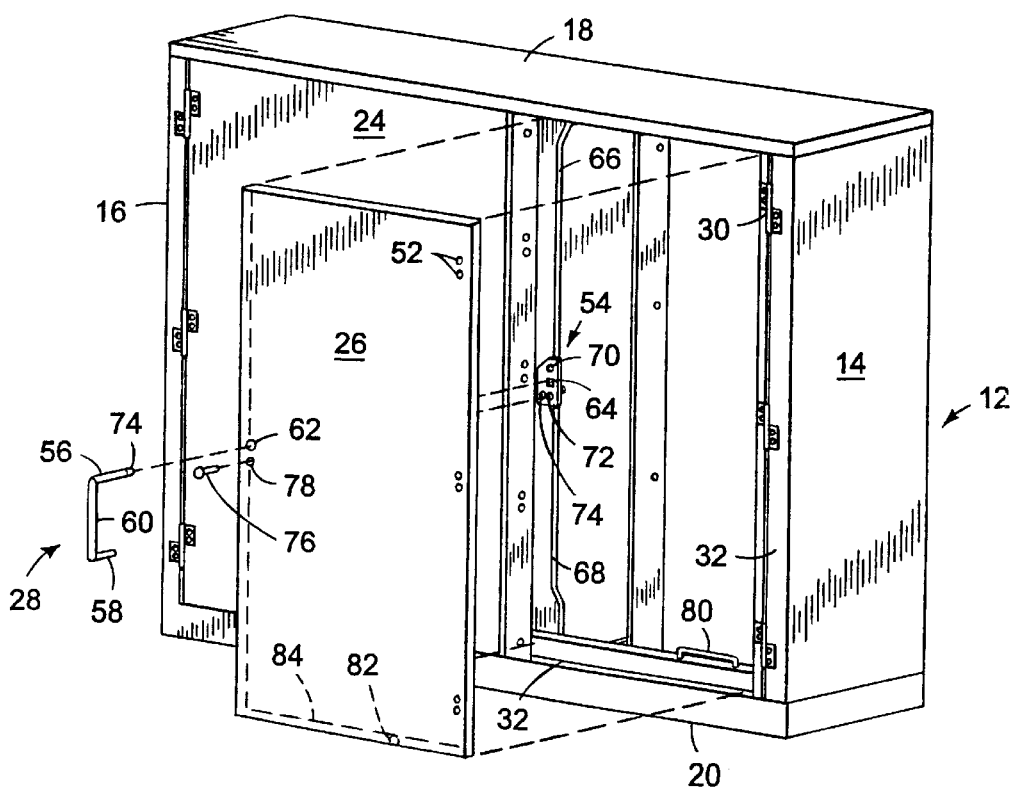
FIG. 2 is a front perspective view of the access cabinet of FIG. 1 with the door in isometric projection.

The pad-mounted transformer 10 is shown in FIG. 2 prior to attachment of the right door 26 to the frame 32 by means of the hinges 30 and hinge apertures 52 and the attachment of the door handle 28 to a door latch 54. The handle 28 is in the form of a abbreviated U-shaped piece having an extended top arm 56 and a short bottom arm 58 connected by a bight 60. The top arm 56 has a rectangular end 74 that extends through a circular clearance aperture 62 in the door 26 and is press-fit into a rectangular aperture 64 formed within the door latch 54. A top rod 66 and bottom rod 68 connect with the door latch 54 by means of apertures 70, 72 and operate in the manner to be shown below with reference to FIG. 4. Door latch 54 includes a threaded locking hole 74 for accepting a locking bolt 76, which extends through a hole 78 in door 26 to prevent unauthorized access.

A door stop 80 in the form of a U-shaped rod is positioned on the bottom of the cabinet door frame 32. One end of the rod is rotationally attached to the door frame 32, while the other end may be positioned in a slot 82 in a flange 84 on the bottom of door 26 when the door 26 is rotated 90 degrees to the open position, thereby holding the door 26 in the open position until and unless the other end is released from the door 26 bottom. The door stop 80 prevents closure of the door 26 in accordance with electrical code requirements.

Figure 3:
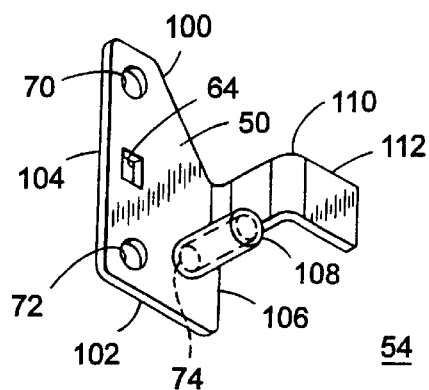
FIG. 3 is an enlarged top perspective view of the latch within the access cabinet of FIGS. 1 and 2.

The door latch 54 is shown in FIG. 3 to depict a single shaped plate 50 having a slanted top edge 100 and planar bottom edge 102 joined by an elongated front edge 104 and short rear edge as indicated at 106. Rectangular aperture 64 is disposed in plate 50 between apertures 70, 72, which are also disposed in plate 50. The apertures 70, 72 receive the top and bottom rods 66, 68 shown earlier in FIG. 3 and the rectangular aperture 64 receives the rectangular end 74 of the long top arm 56 of the door handle 28 as shown earlier in FIG. 2. An L-shaped projection 110 having an end 112 extends from an edge of plate 50 between short edge 106 and slanted top edge 100. A cylinder 108 extends from a portion of plate proximate short edge 106. The interior of cylinder 108 is threaded, forming the threaded locking hole 74 for accepting the locking bolt 76 (FIG. 1). As is best seen in FIG. 4, the L-shaped projection 110 cooperates, via the end 112, with a latch slot 114 formed within a cabinet partition 116, which separates interior compartments (e.g. high voltage and low voltage compartments) 118, 120 of cabinet 12.

Figure 4:
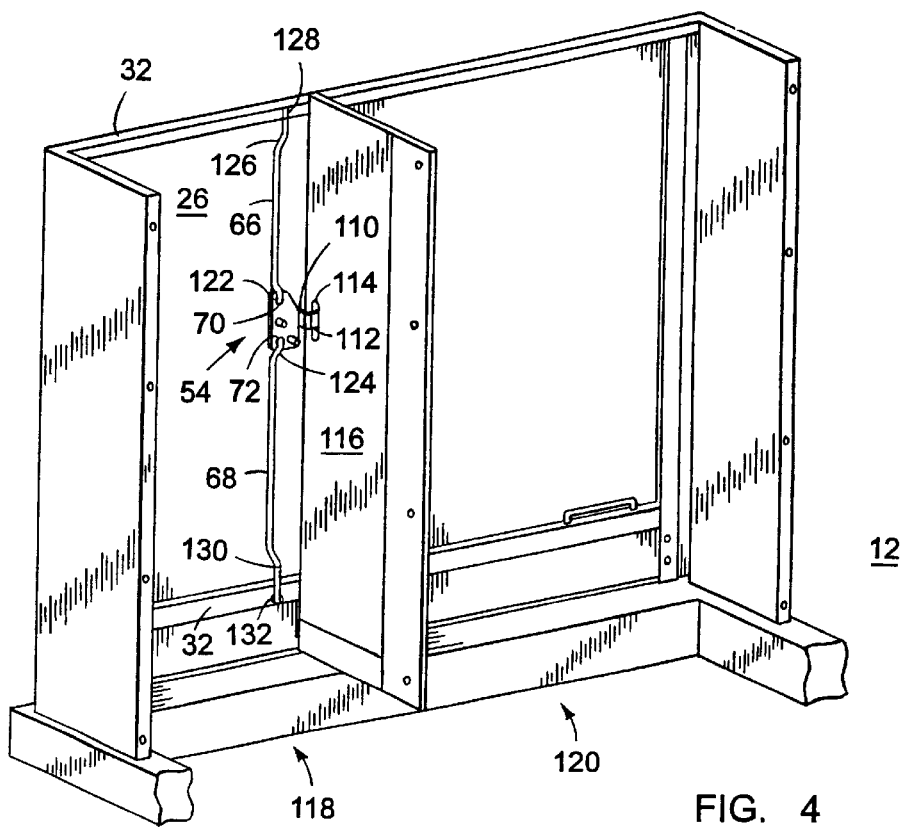
FIG. 4 is a rear perspective view of the interior of the access cabinet of FIGS. 1 and 2.

As shown in FIG. 4, the door latch 54 is positioned on the inside of the door 26 such that the top rod 66 connects with the top aperture 70 via a hooked end 122 and the bottom rod 68 connects with the bottom aperture 72 via a hooked end 124. An off-set end 126, of the top rod 66, projects through an aperture 128 within the top of the door frame 32 and an off-set end 130 of the bottom rod 68 projects through an aperture 132 within the bottom of the door frame 32 to hold the door 26 in the latched position when the end 112 of the L-shaped projection 110 extends within the slot 114 formed in the cabinet partition 116. To move the door latch 54 to the unlatched position, the exterior handle 28 (FIG. 1) is rotated in the clockwise direction as viewed from FIG. 1, to rotate the end 112 of the L-shaped projection 110, from the slot 114, and to simultaneously move the top rod 66 in the downward direction and the bottom rod 68 in the upward direction such that the ends 126, 130 of the top and bottom rods 66, 68 move out from the respective top and bottom apertures 128, 132.

A simple door latch arrangement for pad-mounted transformer cabinets has herein been described. The simple latch assembly and unique door attachment results in a substantial savings both in materials as well as installation.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A door latch arrangement for securing a door on a transformer cabinet, the door latch arrangement comprising:

a plate arranged on an interior surface of the door;

a top aperture at one end of said plate;

a top rod pivotally attached to said plate at said top aperture;

a bottom aperture at an opposite end of said plate;

a bottom rod pivotally attached to said plate at said bottom aperture;

a central aperture intermediate said top and bottom apertures;

a handle arranged on an exterior side of the door, said handle having an arm extending therefrom through a first aperture in the door, said arm terminating in a configuration for reception within said central aperture; and a bolt extending through a second aperture in the door and thereadably engaging said plate via an internally threaded cylinder, said bolt preventing rotation of said plate and said handle for locking the door in a closed position.

2. The door latch of claim 1 wherein said top rod includes an off-set top end and hook-shaped bottom end, said hook-shaped bottom end is received in said top aperture.

3. The door latch of claim 2 wherein said bottom rod includes an off-set bottom end and a hook-shaped top end, said hook-shaped top end is received in said bottom aperture.

4. The door latch of claim 3 wherein said top rod off-set bottom end is received within a top opening within an associated door frame.

5. The door latch of claim 3 wherein said bottom rod off-set bottom end is received within a bottom opening within an associated door frame.

6. The door latch of claim 1 wherein said door handle includes a bottom arm adapted for abutting with an exterior surface of the door.

7. The door latch of claim 1, further including:

a protrusion extending from said plate, said protrusion is received within a slot in a partition dividing adjoining transformer cabinets.

8. A pad-mounted transformer assembly of the type consisting of a transformer cabinet providing access to a transformer interior, said transformer cabinet including:

a partition dividing adjoining transformer cabinets;

a door arranged to provide access to one of said adjoining transformer cabinets;

a door latch arrangement attached to said door for releasably securing said door in a closed position, said door latch arrangement comprising:

a plate arranged on an interior surface of said door, a protrusion extending from said plate, said protrusion is received within a slot in said partition, a top aperture at one end of said plate, a top rod pivotally attached to said plate at said top aperture, a bottom aperture at an opposite end of said plate, a bottom rod pivotally attached to said plate at said bottom aperture, a central aperture intermediate said top and bottom apertures, a handle arranged on an exterior side of said door, said handle having an arm extending therform through a first aperture in said door, said arm terminating in a configuration for reception within said central aperture, and a bolt extending through a second aperture in said door and threadably engaging said plate, said bolt preventing rotation of said plate and said handle for locking said door in a closed position.

9. The transformer of claim 8 wherein said top rod includes an off-set top end and a hook-shaped bottom end, said hook-shaped bottom end is received in said top aperture.

10. The transformer of claim 9 wherein said bottom rod includes an off-set bottom end a hook-shaped top end, said hook-shaped top end is received in said bottom aperture.

11. The transformer of claim 9 wherein said top rod off-set bottom end is received within a top opening within an associated door frame.

12. The transformer of claim 11 wherein said bottom rod off-set bottom end is received within a bottom opening within an associated door frame.

13. The transformer of claim 8 wherein said door handle includes a bottom arm adapted for abutting with an exterior surface of said door.

14. The transformer of claim 8, further including:

a door stop in the form of a U-shaped rod, one end of said U-shaped rod is rotationally attached to an associated door frame, another end of said U-shaped rod engages a slot in said door for preventing closure of said door.

* * * * *